US008346695B2

(12) United States Patent
Pepper et al.

(10) Patent No.: US 8,346,695 B2
(45) Date of Patent: Jan. 1, 2013

(54) SYSTEM AND METHOD FOR MULTIPLE VOLUME SEGMENTATION

(75) Inventors: Randolph E. F. Pepper, Beijing (CN); Oystein Amundrud, Stavanger (NO); Per Salomonsen, Stavanger (NO); Jahn Otto Naesgaard Andersen, Oppegard (NO); Thomas Hagen, Oslo (NO)

(73) Assignee: Schlumberger Technology Corporation, Sugar Land, TX (US)

( * ) Notice: Subject to any disclaimer, the term of this patent is extended or adjusted under 35 U.S.C. 154(b) by 1131 days.

(21) Appl. No.: 12/058,068

(22) Filed: Mar. 28, 2008

(65) Prior Publication Data
US 2008/0243749 A1  Oct. 2, 2008

Related U.S. Application Data

(60) Provisional application No. 60/920,934, filed on Mar. 29, 2007.

(51) Int. Cl.
*G06N 5/00*  (2006.01)
(52) U.S. Cl. .......................................... 706/45; 345/424
(58) Field of Classification Search .................... 706/45; 345/424
See application file for complete search history.

(56) References Cited

U.S. PATENT DOCUMENTS

| | | | | |
|---|---|---|---|---|
| 5,873,051 | A * | 2/1999 | Van Bemmel et al. | 702/17 |
| 5,992,519 | A | 11/1999 | Ramakrishnan et al. | |
| 6,278,949 | B1 * | 8/2001 | Alam | 702/16 |
| 6,302,204 | B1 | 10/2001 | Reimers et al. | |
| 6,304,266 | B1 * | 10/2001 | Li | 345/424 |
| 6,313,837 | B1 | 11/2001 | Assa et al. | |
| 6,690,820 | B2 | 2/2004 | Lees et al. | |
| 6,823,266 | B2 | 11/2004 | Czernuszenko et al. | |
| 6,941,255 | B2 * | 9/2005 | Kennon et al. | 703/10 |
| 6,950,786 | B1 | 9/2005 | Sonneland et al. | |
| 6,980,940 | B1 | 12/2005 | Gurpinar et al. | |
| 7,006,085 | B1 * | 2/2006 | Acosta et al. | 345/419 |
| 7,024,021 | B2 * | 4/2006 | Dunn et al. | 382/109 |
| 2001/0042642 | A1 | 11/2001 | King | |
| 2001/0055016 | A1 * | 12/2001 | Krishnan | 345/424 |
| 2003/0132934 | A1 | 7/2003 | Fremming | |
| 2003/0216897 | A1 | 11/2003 | Endres et al. | |
| 2004/0220846 | A1 | 11/2004 | Cullick et al. | |

(Continued)

FOREIGN PATENT DOCUMENTS

EP    1869640    12/2007

(Continued)

OTHER PUBLICATIONS

"Seismic Tools for Reservoir Management", T. Ariffin, M. Bee, C. Corbett, G. Dorn, H. Ozdemir, C. Pearse, Oilfield Review, vol. 7 Issue 4, Dec. 1, 1995, pp. 4-17.*

(Continued)

*Primary Examiner* — Kakali Chaki
*Assistant Examiner* — Mai T Tran

(57) ABSTRACT

The invention relates to a method of performing oilfield operations for an oilfield, the oilfield having a subterranean formation. The method includes collecting a first volume data set of seismic data and a second volume data set of seismic data, co-rendering a visually-melded scene directly from the first volume data set and the second volume data set, displaying the visually-melded scene comprising a visualized geobody, where the visualized geobody corresponds to a portion of the first volume data set and the second volume data set, and selectively adjusting the oilfield operations based on the visualized geobody.

25 Claims, 11 Drawing Sheets

U.S. PATENT DOCUMENTS

| | | |
|---|---|---|
| 2005/0110791 A1 | 5/2005 | Krishnamoorthy et al. |
| 2005/0140678 A1 | 6/2005 | Gielis et al. |
| 2005/0149307 A1 | 7/2005 | Gurpinar et al. |
| 2006/0151214 A1 | 7/2006 | Prange et al. |
| 2006/0197759 A1 | 9/2006 | Fremming |
| 2006/0279569 A1 | 12/2006 | Acosta et al. |
| 2007/0112547 A1 | 5/2007 | Ghorayeb et al. |
| 2010/0171740 A1 | 7/2010 | Anderson et al. |

FOREIGN PATENT DOCUMENTS

| | | |
|---|---|---|
| WO | 9964896 | 12/1999 |
| WO | 2004025556 A2 | 3/2004 |
| WO | 2004049216 | 6/2004 |

OTHER PUBLICATIONS

Henderson, J., Purves, S. J., and Leppard, C., Automated delineation of geological elements from 3D sismic data through analysis of multichannel, volumetric spectral decomposition data, European Association of Geoscientists and Engineers, first break vol. 25, Mar. 2007, 7 pages.

GeoFrame, The enterprise geoscience solution, Schlumberger Information Solutions, 2008, 1 page.

Petrel 2007.1—What's New, Schlumberger Information Solutions, 2008, 2 pages.

GeoViz, Faster, bigger, better 3D interpretation and visualization, Schlumberger Information Solutions, 2008, 1 page.

Inside Reality, Transforms Collacorative Workflows, Schlumberger Informations Solutions, 2008, 2 pages.

VoxelGeo, Volume-Based Seismic Interpretation, 2005, 6 pages.

GeoProbe Volume Interpretation Software, Halliburton, 2008, 5 pages.

International Search Report from International Application No. PCT/US2008/058876, dated Jul. 28, 2008, 3 pages.

Written Opinion from International Application No. PCT/US2008/058876, dated Jul. 28, 2008, 3 pages.

Examination Report dated Sep. 22, 2011 in the Canadian application No. 2659925, filing date Mar. 24, 2009.

UK Combined Search and Examination Report of UK Patent Application No. GB0905092.3 dated Jul. 20, 2009.

* cited by examiner

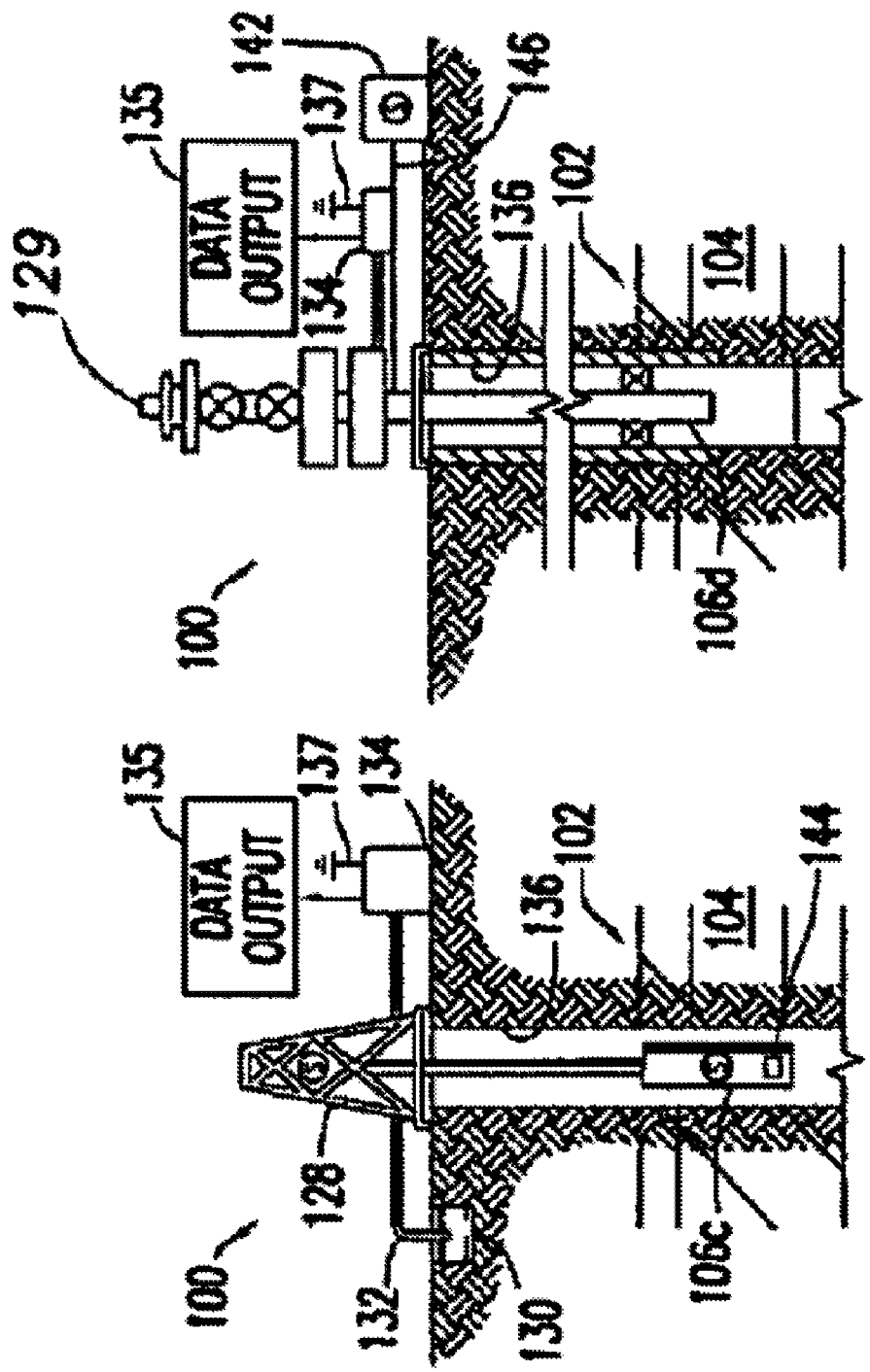

SYSTEM AND METHOD FOR MULTIPLE VOLUME SEGMENTATION

CROSS-REFERENCE TO RELATED APPLICATIONS

This application claims benefit under 35 U.S.C. §119(e) of filing date of U.S. Provisional Application Ser. No. 60/920,934 entitled "SYSTEM AND METHOD FOR MULITPLE VOLUME SEGMENTATION," which was filed on Mar. 29, 2007.

BACKGROUND OF THE INVENTION

1. Field of the Invention

The present invention relates to techniques for performing oilfield operations relating to subterranean formations having reservoirs therein. More particularly, the invention relates to techniques for performing oilfield operations involving an analysis of oilfield conditions, such as geological, geophysical and reservoir engineering conditions, and their impact on such operations.

2. Background

Oilfield operations, such as surveying, drilling, wireline testing, completions and production, are typically performed to locate and gather valuable downhole fluids. As shown in FIG. 1A, surveys are often performed using acquisition methodologies, such as seismic scanners to generate maps of underground structures. These structures are often analyzed to determine the presence of subterranean assets, such as valuable fluids or minerals. This information is used to assess the underground structures and locate the formations containing the desired subterranean assets. Data collected from the acquisition methodologies may be evaluated and analyzed to determine whether such valuable items are present, and if they are reasonably accessible.

As shown in FIG. 1B-1D, one or more wellsites may be positioned along the underground structures to gather valuable fluids from the subterranean reservoirs. The wellsites are provided with tools capable of locating and removing hydrocarbons from the subterranean reservoirs. As shown in FIG. 1B, drilling tools are typically advanced from the oil rigs and into the earth along a given path to locate the valuable downhole fluids. During the drilling operation, the drilling tool may perform downhole measurements to investigate downhole conditions. In some cases, as shown in FIG. 1C, the drilling tool is removed and a wireline tool is deployed into the wellbore to perform additional downhole testing. Throughout this document, the term "wellbore" is used interchangeably with the term "borehole."

After the drilling operation is complete, the well may then be prepared for production. As shown in FIG. 1D, wellbore completions equipment is deployed into the wellbore to complete the well in preparation for the production of fluid therethrough. Fluid is then drawn from downhole reservoirs, into the wellbore and flows to the surface. Production facilities are positioned at surface locations to collect the hydrocarbons from the wellsite(s). Fluid drawn from the subterranean reservoir(s) passes to the production facilities via transport mechanisms, such as tubing. Various equipments may be positioned about the oilfield to monitor oilfield parameters and/or to manipulate the oilfield operations.

During the oilfield operations, data is typically collected for analysis and/or monitoring of the oilfield operations. Such data may include, for example, subterranean formation, equipment, historical and/or other data. Data concerning the subterranean formation is collected using a variety of sources.

Such formation data may be static or dynamic. Static data relates to formation structure and geological stratigraphy that defines the geological structure of the subterranean formation. Dynamic data relates to fluids flowing through the geologic structures of the subterranean formation. Such static and/or dynamic data may be collected to learn more about the formations and the valuable assets contained therein.

Sources used to collect static data may be seismic tools, such as a seismic truck that sends compression waves into the earth as shown in FIG. 1A. These waves are measured to characterize changes in the elastic properties, such as the velocity and density of the geological structure at different depths. This information may be used to generate basic structural maps of the subterranean formation. Other static measurements may be gathered using core sampling and well logging techniques. Core samples are used to take physical specimens of the formation at various depths as shown in FIG. 1B. Well logging involves deployment of a downhole tool into the wellbore to collect various downhole measurements, such as density, resistivity, etc., at various depths. Such well logging may be performed using, for example, the drilling tool of FIG. 1B and/or the wireline tool of FIG. 1C. Once the well is formed and completed, fluid flows to the surface using production tubing as shown in FIG. 1D. As fluid passes to the surface, various dynamic measurements, such as fluid flow rates, pressure and composition may be monitored. These parameters may be used to determine various characteristics of the subterranean formation.

Sensors may be positioned about the oilfield to collect data relating to various oilfield operations. For example, sensors in the wellbore may monitor fluid composition, sensors located along the flow path may monitor flow rates and sensors at the processing facility may monitor fluids collected. Other sensors may be provided to monitor downhole, surface, equipment or other conditions. The monitored data is often used to make decisions at various locations of the oilfield at various times. Data collected by these sensors may be further analyzed and processed. Data may be collected and used for current or future operations. When used for future operations at the same or other locations, such data may sometimes be referred to as historical data.

The processed data may be used to predict downhole conditions, and make decisions concerning oilfield operations. Such decisions may involve well planning, well targeting, well completions, operating levels, production rates and other configurations. Often this information is used to determine when to drill new wells, re-complete existing wells or alter wellbore production.

Data from one or more wellbores may be analyzed to plan or predict various outcomes at a given wellbore. In some cases, the data from neighboring wellbores, or wellbores with similar conditions or equipment is used to predict how a well will perform. There are usually a large number of variables and large quantities of data to consider in analyzing wellbore operations. It is, therefore, often useful to model the behavior of the oilfield operation to determine the desired course of action. During the ongoing operations, the operating conditions may need adjustment as conditions change and new information is received.

Techniques have been developed to model the behavior of geological structures, downhole reservoirs, wellbores, surface facilities as well as other portions of the oilfield operation. Examples of modeling techniques are shown in Patent/Application Nos. U.S. Pat. No. 5,992,519, WO2004/049216, WO1999/064896, U.S. Pat. No. 6,313,837, US2003/0216897, US2003/0132934, US2005/0149307, and US2006/0197759. Typically, existing modeling techniques have been used to analyze only specific portions of the oilfield operation. More recently, attempts have been made to use more than one model in analyzing certain oilfield operations. See, for example, U.S. Patent/Application Nos. U.S. Pat. No. 6,980,940, WO2004/049216, US2004/0220846, and U.S. Ser. No. 10/586,283.

The data analyzed by the geologist, geophysicist and the reservoir engineer may be analyzed using modeling techniques. Examples of modeling techniques are described in U.S. Pat. No. 5,992,519, WO2004/049216, WO1999/064896, U.S. Pat. No. 6,313,837, US2003/0216897, US2003/0132934, US2005/0149307, and US2006/0197759.

Techniques have also been developed for visualizing oilfield data (e.g., seismic data, etc.) to predict, plan and/or otherwise perform certain oilfield operations, such as drilling operations. Examples of techniques for visualizing oilfield data are provided in U.S. Pat. No. 6,823,266, U.S. Pat. No. 6,950,786, U.S. Pat. No. 5,873,051, U.S. Pat. No. 6,304,266, and a recent paper by Jonathan Henderson et al., entitled "Automated Delineation Of Geological Elements From 3D Seismic Data Through Analysis Of Multi-channel, Volumetric Spectral Decomposition Data," published in first break volume 25, March 2007 by European Association of Geoscientists & Engineers.

Despite the development and advancement of various aspects of analyzing oilfield operations, there remains a need to provide techniques capable of performing a complex analysis of oilfield operations based on a wide variety of parameters affecting such operations. It is desirable that such a complex analysis provide an integrated view of geological, geophysical, reservoir engineering, and production engineering aspects of the oilfield. It is further desirable that such techniques consider other factors affecting other aspects of the oilfield operation, such as economics, drilling, production, and other factors. Such a system would preferably consider a wider variety and/or quantity of data affecting the oilfield, and perform an efficient analysis thereof. Preferably, the provided techniques would be capable of one of more of the following, among others: generating static models based on any known measurements, selectively modeling based on a variety of inputs, selectively simulating according to dynamic inputs, adjusting models based on probabilities, selectively linking models of a variety of functions (i.e., economic risk and viability), selectively performing feedback loops throughout the process, selectively storing and/or replaying various portions of the process, selectively displaying and/or visualizing outputs, and selectively performing desired modeling (i.e., uncertainty modeling), workflow knowledge capture, scenario planning and testing, reserves reporting with associated audit trail reporting, etc.

SUMMARY OF INVENTION

In general, in one aspect, the invention relates to a method of performing oilfield operations for an oilfield, the oilfield having a subterranean formation. The method comprises collecting a first volume data set of seismic data and a second volume data set of seismic data, co-rendering a visually-melded scene directly from the first volume data set and the second volume data set, displaying the visually-melded scene comprising a visualized geobody, wherein the visualized geobody is represented by a portion of the first volume data set and the second volume data set, and selectively adjusting the oilfield operations based on the visualized geobody.

In general, in one aspect, the invention relates to a computer readable medium, embodying instructions executable by the computer to perform method steps for performing oilfield operations for an oilfield, the oilfield having a subterranean formation. The instructions comprise functionality to: collect a first volume data set of seismic data and a second volume data set of seismic data, co-render a visually-melded scene directly from the first volume data set and the second volume data set, display the visually-melded scene comprising a visualized geobody, wherein the visualized geobody is represented by a portion of the first volume data set and the second volume data set, and selectively adjust the oilfield operations based on the visualized geobody.

In general, in one aspect, the invention relates to a system for performing oilfield operations for an oilfield, the oilfield having a subterranean formation. The system comprises a surface unit for collecting oilfield data, a portion of the oilfield data being seismic data, a modeling tool operatively linked to the surface unit, the modeling tool comprising a processing module for processing the oilfield data into a first volume data set and a second volume data set, and a data rendering unit for co-rendering a visually-melded scene directly from the first volume data set and the second volume data set, a display unit for displaying the visually-melded scene comprising a visualized geobody, wherein the visualized geobody represents a portion of the first volume data set and the second volume data set, and a drilling system operatively linked to the surface unit for retrieving target fluid in a reservoir of the subterranean formation, wherein the drilling system is selectively adjusted based on the visualized geobody.

Other aspects and advantages of the invention will be apparent from the following description and the appended claims.

BRIEF DESCRIPTION OF DRAWINGS

FIGS. 1A-1D depict a schematic view of an oilfield having subterranean structures containing reservoirs therein, various oilfield operations being performed on the oilfield.

DETAILED DESCRIPTION

Figure 1B:
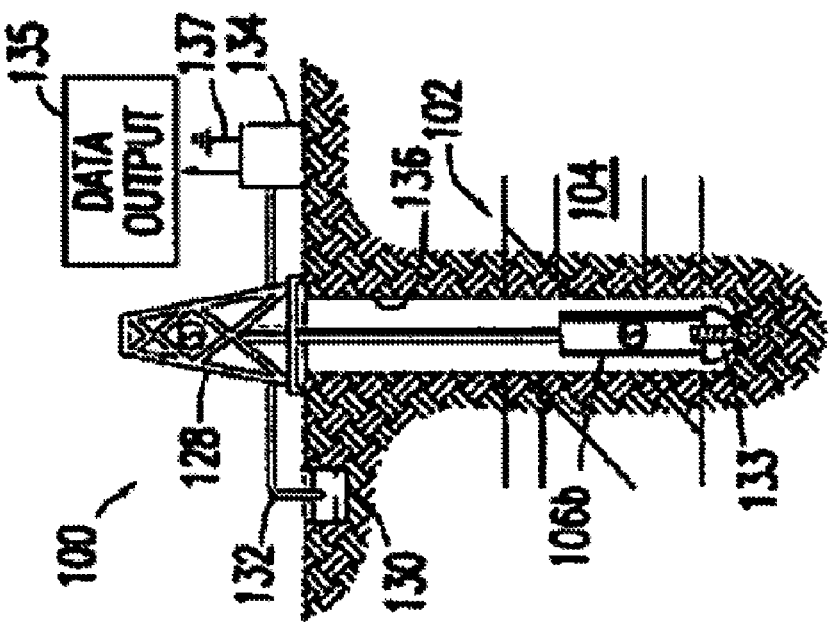

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. In other instances, well-known features have not been described in detail to avoid obscuring the invention.

In general, the present invention relates generally to the integration of geoscience modeling software and the Well Planning System (WPS) to model and display well bore geometry, drilling parameters, risk quantification, and the time and cost to drill a well in a geosciences context.

The present invention involves applications generated for the oil and gas industry. FIGS. 1A-1D illustrate an exemplary oilfield (100) with subterranean structures and geological structures therein. More specifically, FIGS. 1A-1D depict schematic views of an oilfield (100) having subterranean structures (102) containing a reservoir (104) therein and depicting various oilfield operations being performed on the oilfield. Various measurements of the subterranean formation are taken by different tools at the same location. These measurements may be used to generate information about the formation and/or the geological structures and/or fluids contained therein.

Figure 1A:
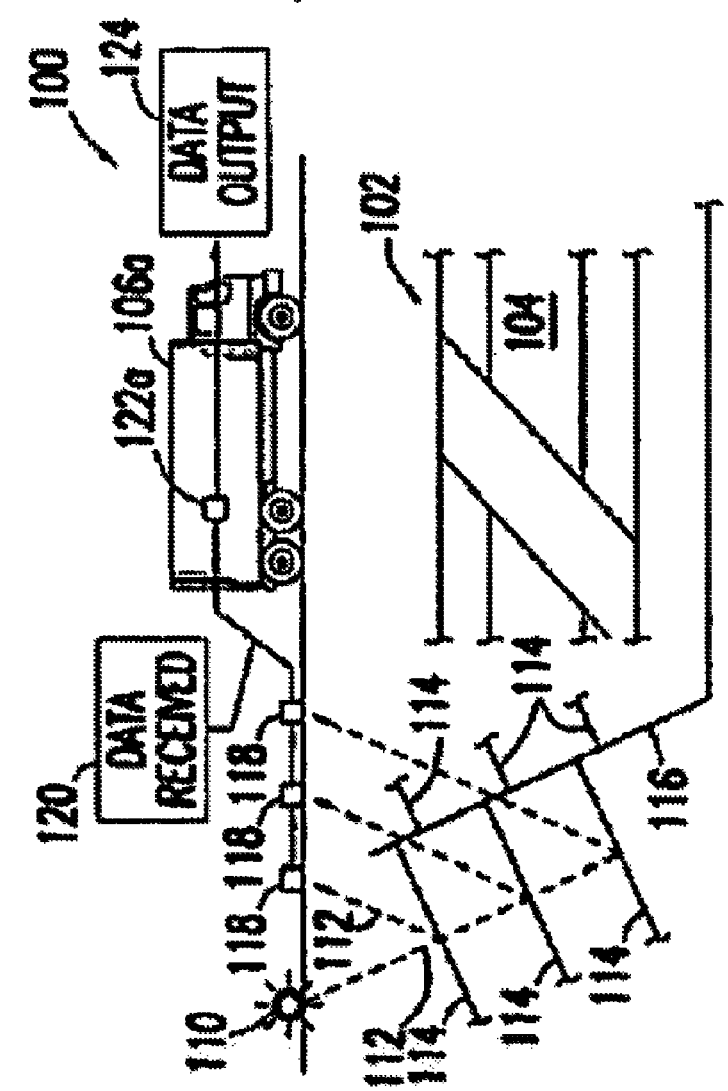

FIG. 1A depicts a survey operation being performed by a seismic truck (106a) to measure properties of the subterranean formation. The survey operation is a seismic survey operation for producing sound vibrations. In FIG. 1A, an acoustic source (110) produces sound vibrations (112) that reflect off a plurality of horizons (114) in an earth formation (116). The sound vibration(s) (112) is (are) received in by sensors, such as geophone-receivers (118), situated on the earth's surface, and the geophones (118) produce electrical output signals, referred to as data received (120) in FIG. 1.

The received sound vibration(s) (112) are representative of different parameters (such as amplitude and/or frequency). The data received (120) is provided as input data to a computer (122a) of the seismic recording truck (106a), and responsive to the input data, the recording truck computer (122a) generates a seismic data output record (124). The seismic data may be further processed, as desired, for example by data reduction.

FIG. 1B depicts a drilling operation being performed by a drilling tool (106b) suspended by a rig (128) and advanced into the subterranean formation (102) to form a wellbore (136). A mud pit (130) is used to draw drilling mud into the drilling tool via a flow line (132) for circulating drilling mud through the drilling tool and back to the surface. The drilling tool is advanced into the formation to reach the reservoir (104). The drilling tool is preferably adapted for measuring downhole properties. The logging while drilling tool may also be adapted for taking a core sample (133) as shown, or removed so that a core sample (133) may be taken using another tool.

A surface unit (134) is used to communicate with the drilling tool and offsite operations. The surface unit (134) is capable of communicating with the drilling tool (106b) to send commands to drive the drilling tool (106b), and to receive data therefrom. The surface unit (134) is preferably provided with computer facilities for receiving, storing, processing, and analyzing data from the oilfield. The surface unit (134) collects data output (135) generated during the drilling operation. Computer facilities, such as those of the surface unit, may be positioned at various locations about the oilfield and/or at remote locations.

Sensors (S), such as gauges, may be positioned throughout the reservoir, rig, oilfield equipment (such as the downhole tool) or other portions of the oilfield for gathering information about various parameters, such as surface parameters, downhole parameters and/or operating conditions. These sensors (S) preferably measure oilfield parameters, such as weight on bit, torque on bit, pressures, temperatures, flow rates, compositions, measured depth, azimuth, inclination and other parameters of the oilfield operation.

The information gathered by the sensors (S) may be collected by the surface unit (134) and/or other data collection sources for analysis or other processing. The data collected by the sensors (S) may be used alone or in combination with other data. The data may be collected in a database and all or select portions of the data may be selectively used for analyzing and/or predicting oilfield operations of the current and/or other wellbores.

Data outputs from the various sensors (S) positioned about the oilfield may be processed for use. The data may be may be historical data, real time data or combinations thereof. The real time data may be used in real time, or stored for later use. The data may also be combined with historical data or other inputs for further analysis. The data may be housed in separate databases, or combined into a single database.

The collected data may be used to perform analysis, such as modeling operations. For example, the seismic data output may be used to perform geological, geophysical, and/or reservoir engineering simulations. The reservoir, wellbore, surface, and/or process data may be used to perform reservoir, wellbore, or other production simulations. The data outputs (135) from the oilfield operation may be generated directly from the sensors (S), or after some preprocessing or modeling. These data outputs (135) may act as inputs for further analysis.

The data is collected and stored at the surface unit (134). One or more surface units may be located at the oilfield, or linked remotely thereto. The surface unit (134) may be a single unit, or a complex network of units used to perform the necessary data management functions throughout the oilfield. The surface unit (134) may be a manual or automatic system. The surface unit (134) may be operated and/or adjusted by a user.

The surface unit (134) may be provided with a transceiver (137) to allow communications between the surface unit (134) and various portions of the oilfield and/or other locations. The surface unit (134) may also be provided with or functionally linked to a controller for actuating mechanisms at the oilfield. The surface unit (134) may then send command signals to the oilfield in response to data received. The surface unit (134) may receive commands via the transceiver or may itself execute commands to the controller. A processor may be provided to analyze the data (locally or remotely) and make the decisions to actuate the controller. In this manner, the oilfield may be selectively adjusted based on the data collected. These adjustments may be made automatically based on computer protocol, or manually by an operator. In some cases, well plans and/or well placement may be adjusted to select optimum operating conditions, or to avoid problems.

FIG. 1C depicts a wireline operation being performed by a wireline tool (106c) suspended by the rig (128) and into the wellbore (136) of FIG. 1B. The wireline tool (106c) is preferably adapted for deployment into a wellbore (136) for performing well logs, performing downhole tests and/or collecting samples. The wireline tool (106c) may be used to provide another method and apparatus for performing a seismic survey operation. The wireline tool (106c) of FIG. 1C may have an explosive or acoustic energy source (144) that provides electrical signals to the surrounding subterranean formations (102).

The wireline tool (106c) may be operatively linked to, for example, the geophones (118) stored in the computer (122a) of the seismic recording truck (106a) of FIG. 1A. The wireline tool (106c) may also provide data to the surface unit (134). As shown data output (135) is generated by the wireline tool (106c) and collected at the surface. The wireline tool (106c) may be positioned at various depths in the wellbore (136) to provide a survey of the subterranean formation (102).

FIG. 1D depicts a production operation being performed by a production tool (106d) deployed from a production unit or christmas tree (129) and into the completed wellbore (136) of FIG. 1C for drawing fluid from the downhole reservoirs into surface facilities (142). Fluid flows from reservoir (104) through perforations in the casing (not shown) and into the production tool (106d) in the wellbore (136) and to the surface facilities (142) via a gathering network (146). Sensors (S) positioned about the oilfield (100) are operatively connected to a surface unit (134) for collecting data therefrom. During the production process, data output (135) may be collected from various sensors (S) and passed to the surface unit (134) and/or processing facilities. This data may be, for example, reservoir data, wellbore data, surface data and/or process data. As shown, the sensor (S) may be positioned in the production tool (106d) or associated equipment, such as the christmas tree, gathering network, surface facilities (142) and/or the production facility, to measure fluid parameters, such as fluid composition, flow rates, pressures, temperatures, and/or other parameters of the production operation.

While only one wellsite is shown, it will be appreciated that the oilfield (100) may cover a portion of land that hosts one or more wellsites. One or more gathering facilities may be operatively connected to one or more of the wellsites for selectively collecting downhole fluids from the wellsite(s).

Throughout the oilfield operations depicted in FIGS. 1A-D, there are numerous business considerations. For example, the equipment used in each of these figures has various costs and/or risks associated therewith. At least some of the data collected at the oilfield relates to business considerations, such as value and risk. This business data may include, for example, production costs, rig time, storage fees, price of oil/gas, weather considerations, political stability, tax rates, equipment availability, geological environment and other factors that affect the cost of performing the oilfield operations or potential liabilities relating thereto. Decisions may be made and strategic business plans developed to alleviate potential costs and risks. For example, an oilfield plan may be based on these business considerations. Such an oilfield plan may, for example, determine the location of the rig, as well as the depth, number of wells, duration of operation and other factors that will affect the costs and risks associated with the oilfield operation.

While FIG. 1 depicts monitoring tools used to measure properties of an oilfield, it will be appreciated that the tools may be used in connection with non-oilfield operations, such as mines, aquifers or other subterranean facilities. Also, while certain data acquisition tools are depicted, it will be appreciated that various measurement tools capable of sensing properties, such as seismic two-way travel time, density, resistivity, production rate, etc., of the subterranean formation (102) and/or its geological structures may be used. Various sensors (S) may be located at various positions along the subterranean formation and/or the monitoring tools to collect and/or monitor the desired data. Other sources of data may also be provided from offsite locations.

The oilfield configuration of FIG. 1 is not intended to limit the scope of the invention. Part, or all, of the oilfield may be on land and/or sea. Also, while a single oilfield measured at a single location is depicted, the present invention may be utilized with any combination of one or more oilfields, one or more processing facilities and one or more wellsites.

Figure 2B:
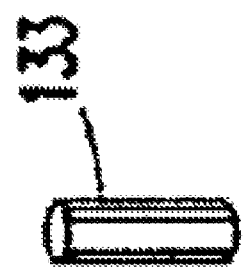
FIGS. 2A-2D show graphical depictions of data collected by the tools of FIGS. 1A-D, respectively.
Figure 2A:
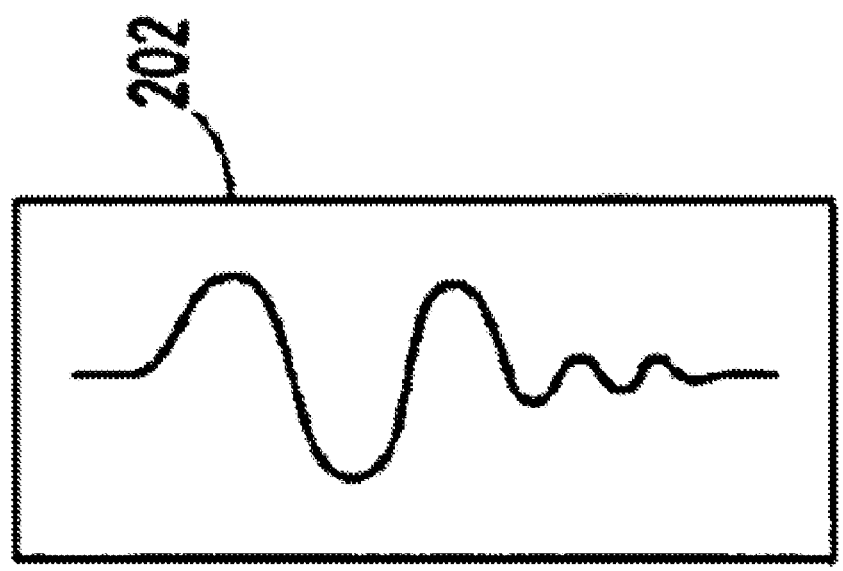
Figure 2D:
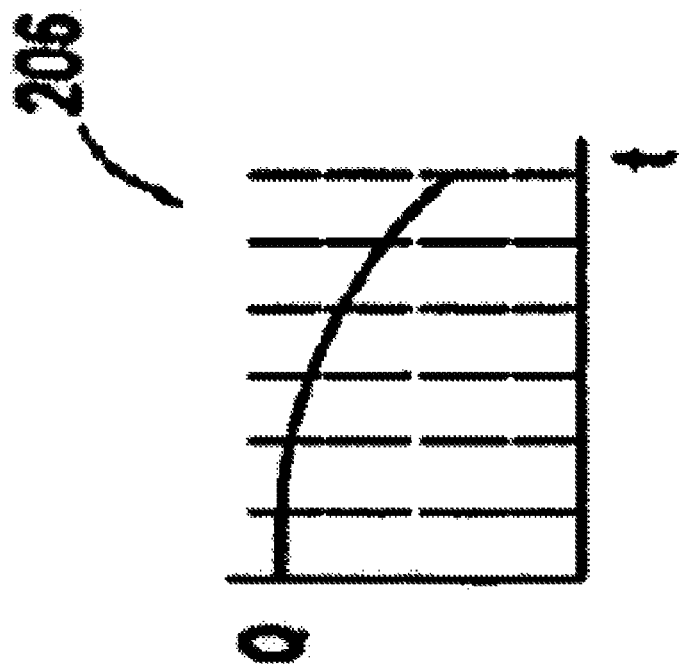
Figure 2C:
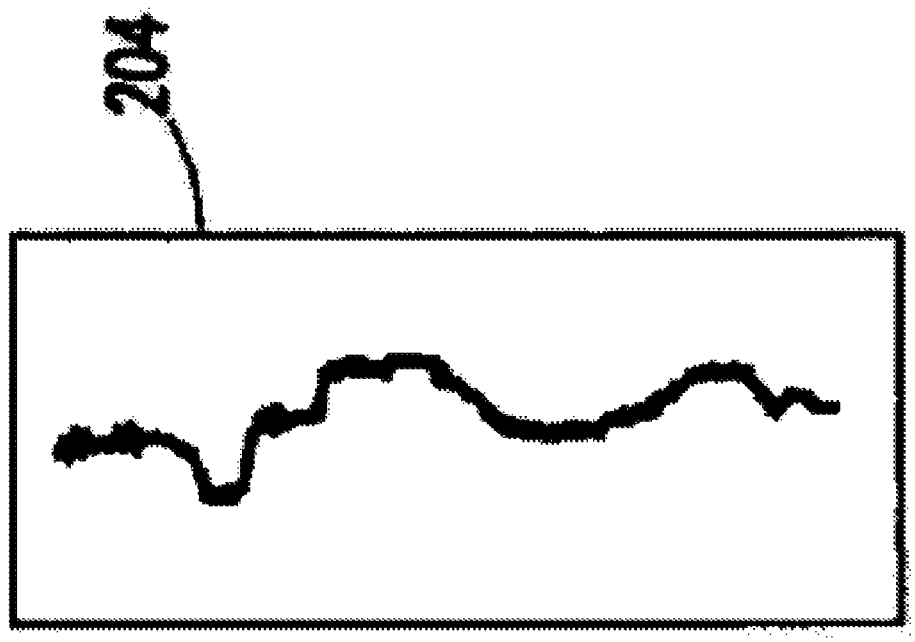

FIGS. 2A-D are graphical depictions of data collected by the tools of FIGS. 1A-D, respectively. FIG. 2A depicts a seismic trace (202) of the subterranean formation (102) of FIG. 1A taken by survey tool (106a). The seismic trace (202) measures the two-way response over a period of time. FIG. 2B depicts a core sample (133) taken by the logging tool (106b). A core test typically provides a graph of the density, resistivity, or other physical property of the core sample (133) over the length of the core. FIG. 2C depicts a well log (204) of the subterranean formation (102) of FIG. 1C taken by the wireline tool (106c). The wireline log typically provides a resistivity measurement of the formation at various depts. FIG. 2D depicts a production decline curve (206) of fluid flowing through the subterranean formation (102) of FIG. 1D taken by the production tool (106d). The production decline curve (206) typically provides the production rate (Q) as a function of time (t).

The respective graphs of FIGS. 2A-2C contain static measurements that describe the physical characteristics of the formation. These measurements may be compared to determine the accuracy of the measurements and/or for checking for errors. In this manner, the plots of each of the respective measurements may be aligned and scaled for comparison and verification of the properties.

FIG. 2D provides a dynamic measurement of the fluid properties through the wellbore. As the fluid flows through the wellbore, measurements are taken of fluid properties, such as flow rates, pressures, composition, etc. As described below, the static and dynamic measurements may be used to generate models of the subterranean formation to determine characteristics thereof.

The models may be used to create an earth model defining the subsurface conditions. This earth model predicts the structure and its behavior as oilfield operations occur. As new information is gathered, part or all of the earth model may need adjustment.

Figure 3A:
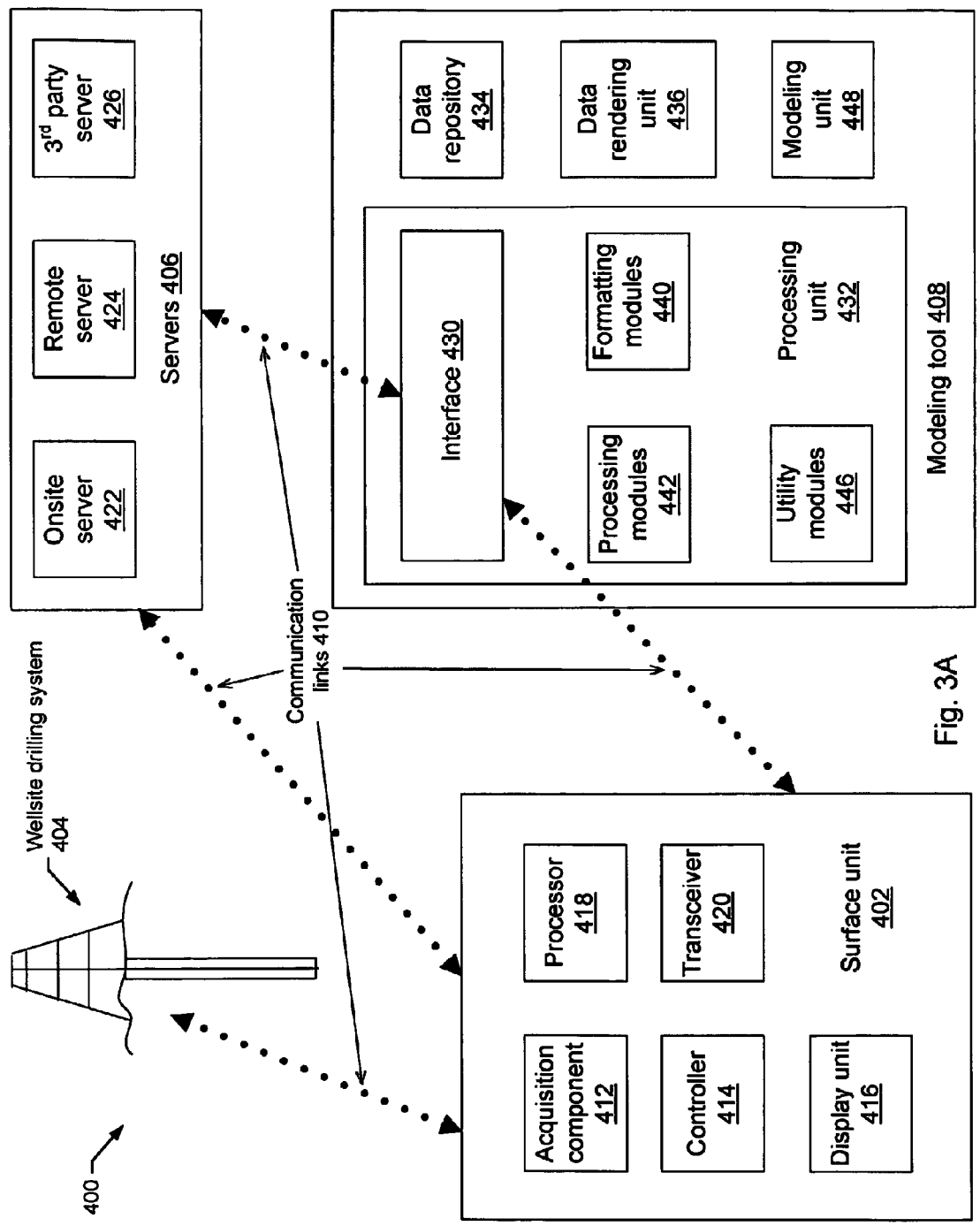
FIG. 3A shows a schematic diagram of a system for performing oilfield operations of an oilfield.

FIG. 3A is a schematic view of a system (400) for performing oilfield operations of an oilfield. As shown, the system (400) includes a surface unit (402) operatively connected to a wellsite drilling system (404), servers (406) operatively linked to the surface unit (402), and a modeling tool (408) operatively linked to the servers (406). As shown, communication links (410) are provided between the wellsite drilling system (404), surface unit (402), servers (406), and modeling tool (408). A variety of links may be provided to facilitate the flow of data through the system. For example, the communication links (410) may provide for continuous, intermittent, one-way, two-way and/or selective communication throughout the system (400). The communication links (410) may be of any type, such as wired, wireless, etc.

The surface unit (402) is preferably provided with an acquisition component (412), a controller (414), a display unit (416), a processor (418) and a transceiver (420). The acquisition component (412) collects and/or stores data of the oilfield. This data may be data measured by the sensors (S) of the wellsite as described with respect to FIG. 1A-1D. This data may also be data received from other sources.

The controller (414) is enabled to enact commands at the oilfield. The controller (414) may be provided with actuation means that can perform drilling operations, such as steering, advancing, or otherwise taking action at the wellsite. Commands may be generated based on logic of the processor (418), or by commands received from other sources. The processor (418) is preferably provided with features for manipulating and analyzing the data. The processor (418) may be provided with additional functionality to perform oilfield operations.

A display unit (416) may be provided at the wellsite and/or remote locations for viewing oilfield data (not shown). The oilfield data represented by a display unit (416) may be raw data, processed data and/or data outputs generated from various data. The display unit (416) is preferably adapted to provide flexible views of the data, so that the screens depicted may be customized as desired. A user may plan, adjust, and/or otherwise perform oilfield operations (e.g., determine the desired course of action during drilling) based on reviewing the displayed oilfield data. The oilfield operations may be selectively adjusted in response to viewing the data on the display unit (416). The display unit (416) may include a two-dimensional (2D) display or a three-dimensional (3D) display for viewing oilfield data or various aspects of the oilfield operations.

The transceiver (420) provides a means for providing data access to and/or from other sources. The transceiver (420) also provides a means for communicating with other components, such as the servers (406), the wellsite drilling system (404), surface unit (402), and/or the modeling tool (408).

The servers (406) may be used to transfer data from one or more wellsites to the modeling tool (408). As shown, the servers (406) include an onsite server (422), a remote server (424), and a third party server (426). The onsite server (422) may be positioned at the wellsite and/or other locations for distributing data from the surface unit. The remote server (424) is positioned at a location away from the oilfield and provides data from remote sources. The third party server (426) may be onsite or remote, but is operated by a third party, such as a client.

The servers (406) are preferably capable of transferring drilling data, such as logs, drilling events, trajectory, and/or other oilfield data, such as seismic data, historical data, economics data, or other data that may be of use during analysis. The type of server is not intended to limit the invention. Preferably the system is adapted to function with any type of server that may be employed.

The servers (406) communicate with the modeling tool (408) as indicated by the communication links (410). As indicated by the multiple arrows, the servers (406) may have separate communication links (410) with the modeling tool (408). One or more of the servers (406) may be combined or linked to provide a combined communication link (410).

The servers (406) collect a wide variety of data. The data may be collected from a variety of channels that provide a certain type of data, such as well logs. The data from the servers is passed to the modeling tool (408) for processing. The servers (406) may also be used to store and/or transfer data.

The modeling tool (408) is operatively linked to the surface unit (402) for receiving data therefrom. In some cases, the modeling tool (408) and/or server(s) (406) may be positioned at the wellsite. The modeling tool (408) and/or server(s) (406) may also be positioned at various locations. The modeling tool (408) may be operatively linked to the surface unit via the server(s) (406). The modeling tool (408) may also be included in or located near the surface unit (402).

The modeling tool (408) includes an interface (430), a processing unit (432), a modeling unit (448), a data repository (434) and a data rendering unit (436). The interface (430) communicates with other components, such as the servers (406). The interface (430) may also permit communication with other oilfield or non-oilfield sources. The interface (430) receives the data and maps the data for processing. Data from servers (406) typically streams along predefined channels, which may be selected by the interface (430).

As depicted in FIG. 3A, the interface (430) selects the data channel of the server(s) (406) and receives the data. The interface (430) also maps the data channels to data from the wellsite. The data may then be passed to the processing modules (442) of the modeling tool (408). Preferably, the data is immediately incorporated into the modeling tool (408) for real-time sessions or modeling. The interface (430) creates data requests (for example surveys, logs and/or other volume data sets), displays the user interface, and handles connection state events. The interface (430) also instantiates the data into a data object for processing.

The processing unit (432) includes formatting modules (440), processing modules (442), and utility modules (446). These modules are designed to manipulate the oilfield data for real-time analysis.

The formatting modules (440) are used to conform the data to a desired format for processing. Incoming data may need to be formatted, translated, converted or otherwise manipulated for use. The formatting modules (440) are configured to enable the data from a variety of sources to be formatted and used so that the data processes and displays in real time.

The utility modules (446) provide support functions to the drilling system. The utility modules (446) include the logging component (not shown) and the user interface (UI) manager component (not shown). The logging component provides a common call for all logging data. This module allows the logging destination to be set by the application. The logging component may also be provided with other features, such as a debugger, a messenger, and a warning system, among others. The debugger sends a debug message to those using the system. The messenger sends information to subsystems, users, and others. The information may or may not interrupt the operation and may be distributed to various locations and/or users throughout the system. The warning system may be used to send error messages and warnings to various locations and/or users throughout the system. In some cases, the warning messages may interrupt the process and display alerts.

The UI manager component creates user interface elements for displays. The UI manager component defines user input screens, such as menu items, context menus, toolbars, and settings windows. The UI manager may also be used to handle events relating to these user input screens.

The processing module (442) is used to analyze the data and generate outputs. As described above, the data may include static data, dynamic data, historic data, real-time data, or other types of data. Further, the data may relate to various aspects of the oilfield operations, such as formation structure, geological stratigraphy, core sampling, well logging, density, resistivity, fluid composition, flow rate, downhole condition, surface condition, equipment condition, or other aspects of the oilfield operations. The data is processed by the processing module (442) into multiple volume data sets for storage and retrieval.

The data repository (434) may store the data for the modeling unit (448). The data is preferably stored in a format available for use in real-time (e.g., information is updated at approximately the same rate the information is received). The data is generally passed to the data repository (434) from the processing modules (442). The data can be persisted in the file system (e.g., as an extensible markup language (XML) file) or in a database. The system determines which storage is the most appropriate to use for a given piece of data and stores the data in a manner to enable automatic flow of the data through the rest of the system in a seamless and integrated fashion. The system also facilitates manual and automated workflows (such as Modeling, Geological & Geophysical workflows) based upon the persisted data.

The data rendering unit (436) performs rendering algorithm calculation to provide one or more displays for visualizing the data. The displays may be presented to a user at the display unit (416). The data rendering unit (436) may contain a 2D canvas, a 3D canvas, a well section canvas or other canvases as desired. The data rendering unit (436) may selectively provide displays composed of any combination of one or more canvases. The canvases may or may not be synchronized with each other during display. The data rendering unit (436) is preferably provided with mechanisms for actuating various canvases or other functions in the system. Further, the data rendering unit (436) may selectively provide displays composed of any combination of one or more volume data sets. The volume data sets typically contain exploration and production data, such as that shown in FIG. 2A-2D.

The modeling tool (408) performs the key modeling functions for generating complex oilfield outputs. Examples of such complex oilfield outputs include a visually-melded scene and a segmented geobody as described in detail in FIGS. 4-8 below.

While specific components are depicted and/or described for use in the units and/or modules of the modeling tool (408), it will be appreciated that a variety of components with various functions may be used to provide the formatting, processing, utility and coordination functions necessary to provide processing in the modeling tool (408). The components may have combined functionalities and may be implemented as software, hardware, firmware, or combinations thereof.

Further, components (e.g., the processing modules (442) and the data rendering unit (436)) of the modeling tool (408) may be located in an onsite server (422) or in distributed locations where remote server (424) and/or third party server (426) may be involved. The onsite server (422) may be located within the surface unit (402).

Figure 3B:
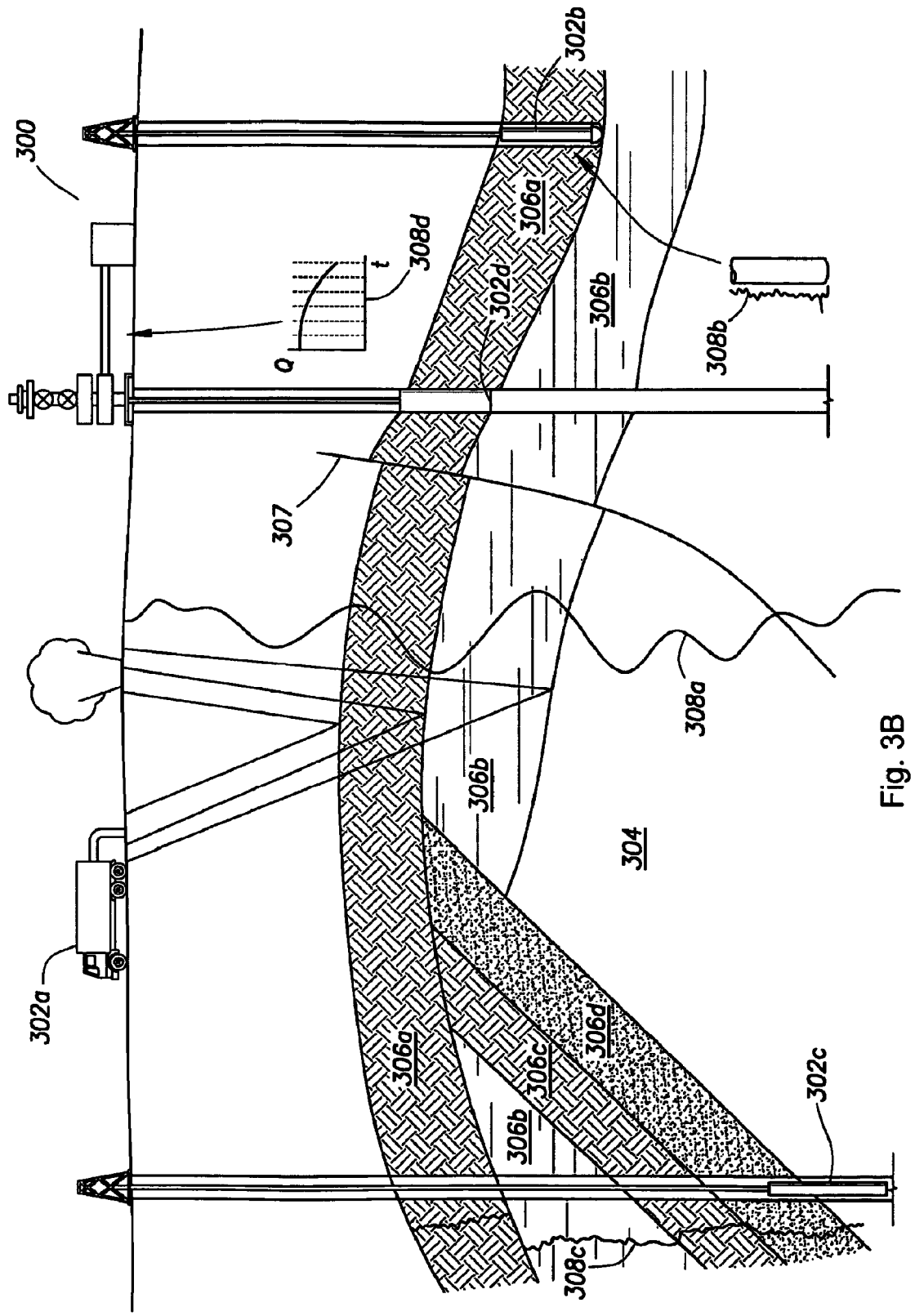
FIG. 3B shows a schematic view, partially in cross-section of an oilfield having data acquisition tools.

FIG. 3B is a schematic view, partially in cross section of an oilfield (300) having data acquisition tools (302a), (302b), (302c), and (302d) positioned at various locations along the oilfield for collecting data of the subterranean formation (304). The data acquisition tools (302a)-(302d) may be the same as data acquisition tools (106a)-(106d) of FIG. 1, respectively. As shown, the data acquisition tools (302a)-(302d) generate data plots or measurements (308a)-(308d), respectively.

Data plots (308a)-(308c) are examples of static data plots that may be generated by the data acquisition tools (302a)-(302d), respectively. Static data plot (308a) is a seismic two-way response time and may be the same as the seismic trace (202) of FIG. 2A. Static plot (308b) is core sample data measured from a core sample of the formation (304), similar to core sample (133) of FIG. 2B. Static data plot (308c) is a logging trace, similar to the well log (204) of FIG. 2C. Data plot (308d) is a dynamic data plot of the fluid flow rate over time, similar to the graph (206) of FIG. 2D. Other data may also be collected, such as historical data, user inputs, economic information other measurement data and other parameters of interest.

The subterranean formation (304) has a plurality of geological structures (306a)-(306e). As shown, the formation (304) has a first formation layer (306a), a second formation layer (306b), a shale layer (306c), and a sand layer (306d). A fault line (307) extends through the formation. The static data acquisition tools are preferably adapted to measure the formation (304) and detect the characteristics of the geological structures of the formation (304).

While a specific subterranean formation with specific geological structures is depicted, it will be appreciated that the formation may contain a variety of geological structures. Fluid may also be present in various portions of the formation. Each of the measurement devices may be used to measure properties of the formation and/or its underlying structures. While each acquisition tool (e.g., (302a)-(302d)) is shown as being in specific locations along the formation, it will be appreciated that one or more types of measurement may be taken at one or more location across one or more oilfields or other locations for comparison and/or analysis. The data collected from various sources may be processed by the processing unit (432) and stored in the data repository (434) as multiple data sets ready to be retrieved for evaluation. The data sets may include a 2D data set, a 3D data set (i.e., 3D volume data set), or other formats known within the art. Typically, seismic data displayed in the static data plot (308a) from the data acquisition tool (302a) is used by a geophysicist to determine characteristics of the subterranean formation (304). Core data shown in static plot (308b) and/or log data from the well log (308c) are typically used by a geologist to determine various characteristics of the geological structures of the subterranean formation (304). Production data from the production graph (308d) is typically used by the reservoir engineer to determine fluid flow reservoir characteristics. Further, one or more data sets may be visualized simultaneously to provide a broader view of the features of the subterranean formations.

FIG. 4-8 depicts visualizing and segmenting multiple volume data sets of oilfield data such as the oilfield data generated by the data acquisition tools (302a)-(308c) of FIG. 3B, respectively. These multiple volume data sets may have different accuracies based on the types of measurements available, quality of data, location and other factors. The multiple volume data sets of FIGS. 4-8 may be taken using certain data acquisition tools (e.g., data acquisition tools (302a)-(308c)) at a single location of the oilfield. Alternatively, one or more of the same or different data acquisition tools may be used to take measurements at one or more locations throughout the oilfield to generate a variety of volume data sets.

Figure 4:
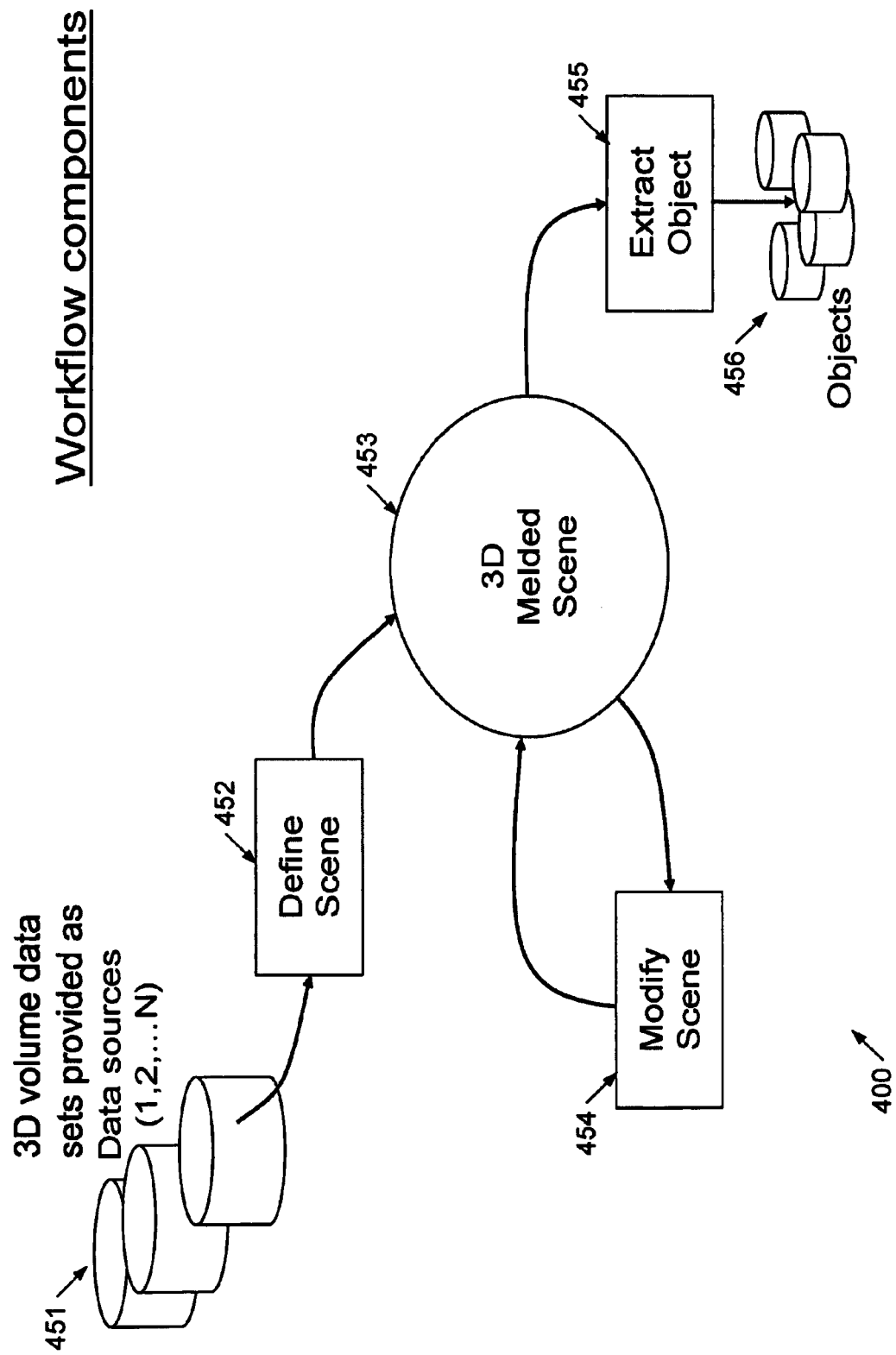
FIG. 4 shows a diagram of workflow components in visualizing and segmenting multiple data sets of oilfield data.

FIG. 4 shows a schematic diagram of workflow components in visualizing and segmenting multiple volume data sets of oilfield data. Here, the workflow (400) includes multiple 3D volume data sets (451), three dimensional visually-melded scene (or 3D melded scene) (453), define scene procedure (452), modify scene procedure (454), extract object procedure (455), and multiple extracted objects (456).

As described in reference to FIGS. 3A and 3B above, each of the 3D volume data sets (451) may be stored in the data repository (434) and may include data with associated attributes representing characteristics of subterranean formation (304), such as geometry, location, amplitude, procedure, frequency, or semblance recorded, collected, derived, or otherwise obtained during geologic/seismic survey by the data acquisition tools (302a)-(302d). For example, the data plots (308a)-(308d) may be processed by the processing modules (442) into multiple 3D volume data sets (451) and stored in the data repository (434). The 3D volume data sets (451) may include various formats known in the art.

In the example shown in FIG. 4, the 3D volume data sets (451) are provided as data sources 1 through N for generating the 3D melded scene (453). Each of the extracted objects (456) is a representation of a geologic element or geological structure of the subterranean formation and corresponds to a sub-region within the spatial extent of the multiple 3D volume data sets (451) that is identified as connected non-transparent voxels in the 3D melded scene (453). The collection of these connected non-transparent voxels is referred to as a geobody within the art. The 3D melded scene (453) may be displayed using the display unit (416) as shown in FIG. 3A above.

A user of the workflow (400) may define an initial scene using the define scene procedure (452), which selects two or more volume data sets from the multiple 3D volume data sets (451) and a geometric boundary as a rendering container (not shown). The selected volume data sets are then co-rendered (i.e., rendered directly from multiple volume data sets without combining the multiple volume data sets into an intermediate resultant volume data set and/or rendered concurrently from multiple volume data sets without completing the rendering from any single volume data set before starting the rendering from the rest of the volume data sets) using the define scene procedure (452) to display an initial version of the 3D melded scene (453). The initial version of the 3D melded scene (453) is based on an initial co-rendering rule. The initial co-rendering rule may be modified by the user using the modify scene procedure (454) to "re-render" and modify visual contents of the 3D melded scene (453) until a geobody of interest is visualized.

In addition, the geobody of interest may be identified and/or selected from the 3D melded scene (453) to perform segmentation of the selected volume data sets by using the extract object procedure (455). A representation of the selected geobody may be extracted from the segmented volume data sets into constituent objects (456). For example, the geometry, location, seismic data, or other data and/or attributes contained in the segmented volume data sets associated with the geobody may be extracted by selecting the connected non-transparent voxels corresponding to the selected geobody in the 3D melded scene (453). The segmentation and/or extraction may be initiated by the user providing a 3D coordinate on the geobody of interest in the 3D melded scene (453) or automated methods of selecting 3D coordinates such as exhaustive search. The 3D coordinate may be a coordinate referring to a portion of the geobody of interest rendered from any of the selected volume data sets. The 3D coordinate may be obtained by placing a 3D cursor or executing a mouse click on the portion of the geobody. The 3D coordinate may be a screen coordinate of a voxel or a coordinate contained in the selected volume data sets and can be translated to a physical coordinate of a location in a subterranean formation, such as the subterranean formation.

In general, the workflow (400) does not require that selected data sets be combined into a resultant data set before it is rendered. As a result, this approach eliminates processing delays and provides interactive capabilities to the modify scene procedure (454), as described in more detail in reference to FIG. 6 below. Further, the workflow (400) typically does not limit the segmentation to only one primary data set of the multiple data sets (451). More details are described in reference to FIG. 7 below.

Figure 5:
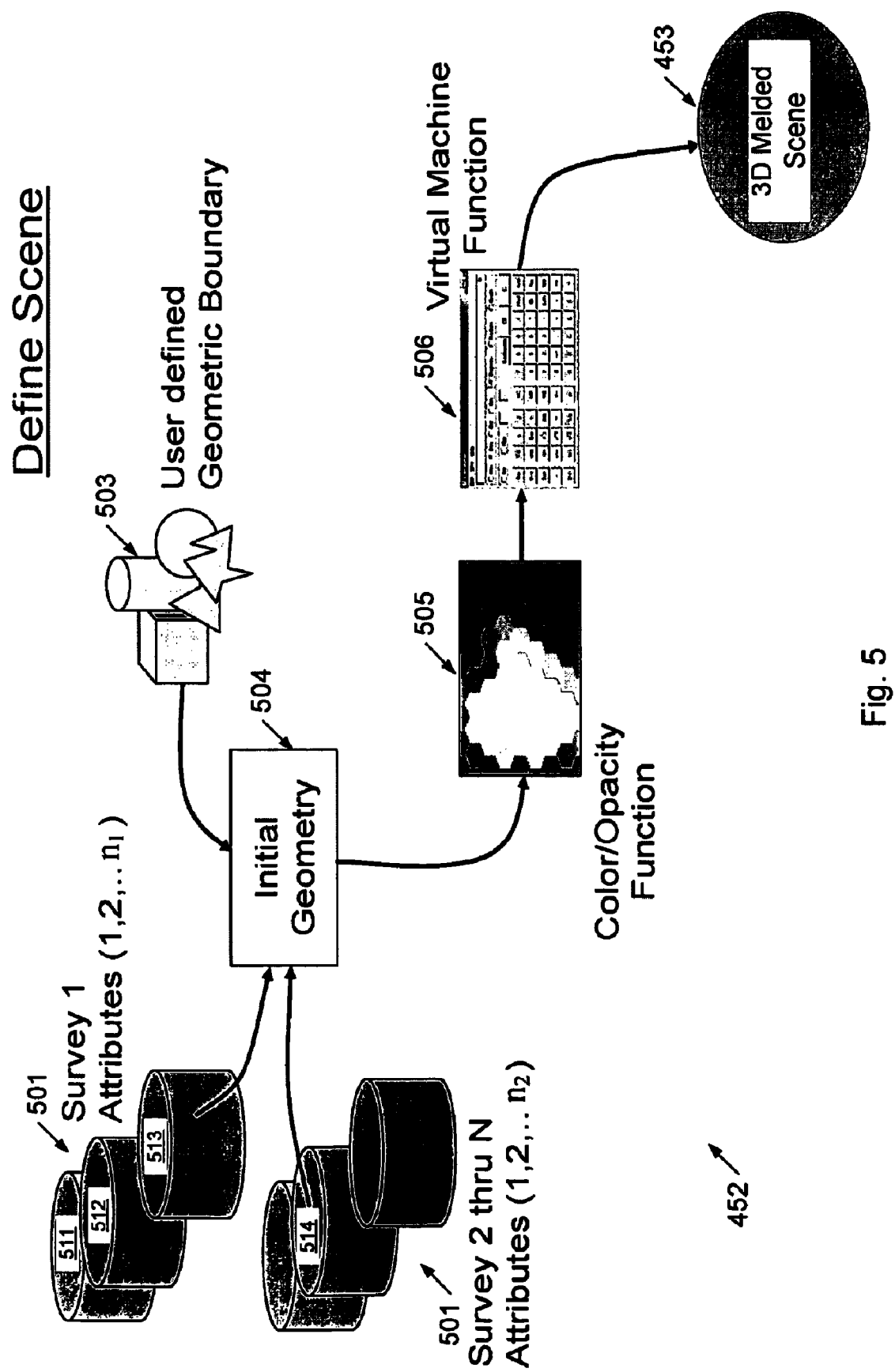
FIG. 5 shows a diagram of the define scene procedure in visualizing and segmenting multiple data sets of oilfield data.

FIG. 5 shows a schematic diagram of the define scene procedure (452 in FIG. 4) in visualizing and segmenting multiple data sets of oilfield data. Here, the define scene procedure (452) includes survey 1 (501), surveys 2 through N (502), a user defined geometric boundary (503), an initial geometry (504), a color/opacity function (505), a virtual machine function (506), and a 3D melded scene (453). The survey 1 (501) and surveys 2 through N (502) include multiple 3D volume data sets, which may be the same as the multiple 3D volume data sets (451) as shown in FIG. 4 above. The user-defined geometric boundary (503) includes various geometric shapes and can be used to compose the initial geometry (504) to limit a portion (e.g., a portion of the spatial extent) of the multiple 3D volume data sets (451) for rendering the 3D melded scene (453). The color/opacity function (505) includes multiple color tables and opacity tables for co-rendering the 3D melded scene (453). The virtual machine function (506) includes numerical and/or logical functions to scale, combine, or otherwise manipulate the contents of the 3D volume data sets, the color tables, and/or the opacity tables.

The survey 1 (501) includes multiple 3D volume data sets (511), (512), and (513) having multiple attributes, such as attribute 1 through $n_1$. The survey 1 (501) may be provided as data source 1 as shown in FIG. 4 above. The multiple attributes (e.g., attribute 1 through $n_1$) may represent various characteristics of subterranean formation (304), such as location, amplitude, procedure, frequency, or semblance recorded, collected, derived, or otherwise obtained during geologic/seismic survey by the data acquisition tools (302a)-(302d) shown and described in relation to FIG. 3.

Similarly, the surveys 2 through N (502) may be 3D volume data sets provided as data sources 2 through N, as shown in FIG. 4 above. The surveys 2 through N (502) may include a 3D volume data set (514). In one example, 3D volume data sets (511), (512), (513), and (514) may include different versions of a single survey all having the same seismic attribute where each 3D volume data set may have the same spatial extent. In other examples, these 3D volume data sets may include different data from different surveys and correspond to different spatial extents and/or different scales. Further, these spatial extents, although different, may be overlapping with one another.

In the example shown in FIG. 5, the 3D volumes data sets (513) and (514) may be selected by a user of the workflow (400) for co-rendering the 3D melded scene (453). The 3D volumes data sets (513) and (514) may be overlapping in their spatial extents. The initial geometry (504) may be used to limit the co-rendering within a subset of the spatial extents of the 3D volumes data sets (513) and (514). Various different components of the user defined geometric boundary may be used to compose the initial geometry (504). The initial geometry (504) may be composed as a single geometric boundary to limit the co-rendering from both the 3D volumes data sets (513) and (514). Alternatively, the initial geometry (504) may be composed to include multiple overlapping geometric containers, such as a first and a second overlapping geometric containers where the first container limits the co-rendering from the 3D volumes data set (513) and the second container limits the co-rendering from the 3D volumes data set (514), respectively.

These overlapping geometric containers may each be associated with a separate co-rendering rule for co-rendering from 3D volume data sets with overlapping spatial extents. Each of these co-rendering rules includes an independent control of color and opacity within each of the geometric containers, as well as a combining numerical/logical function for manipulating the contents of the 3D volume data sets, the color tables, and/or the opacity tables within the overlapping spatial extents of the geometric containers. For example, an initial version of the color/opacity function (505) may include a first color/opacity table to render from the 3D volume data set (513) within a first geometric container of the initial geometry (504). The color/opacity function (505) may also include a second color/opacity table to render from the 3D volume data set (514) within a second geometric container of the initial geometry (504). For example, an initial version of the virtual machine function may be a default condition where the contents of the 3D volume data sets are not scaled and the color/opacity tables are not combined.

Each color/opacity table may include information relating to specific color/opacity settings of voxels corresponding to data/attribute values contained in a 3D volume data set, as is well known within the art. The color table may be defined to highlight connected, non-transparent voxels for investigating geobody of interest in the 3D melded scene (453). In addition, the opacity table may be defined to render only a selected range of data/attribute values non-transparent. The transitions from transparent or near transparent voxels to opaque or near opaque voxels in the 3D melded scene (453) depends on the transitions of data/attribute values in the 3D volume data set and may define a noticeable opacity boundary. This functionality allows the user of the workflow (400) to selectively adjust the 3D melded scene (453) and reveal intricate details from a complex display.

Although the example given above includes two selected 3D volume data sets, it will be appreciated that the method described in reference to FIG. 5 is applicable to co-rendering from multiple 3D volume data sets and is not limited to co-rendering from two data sets.

Figure 6:
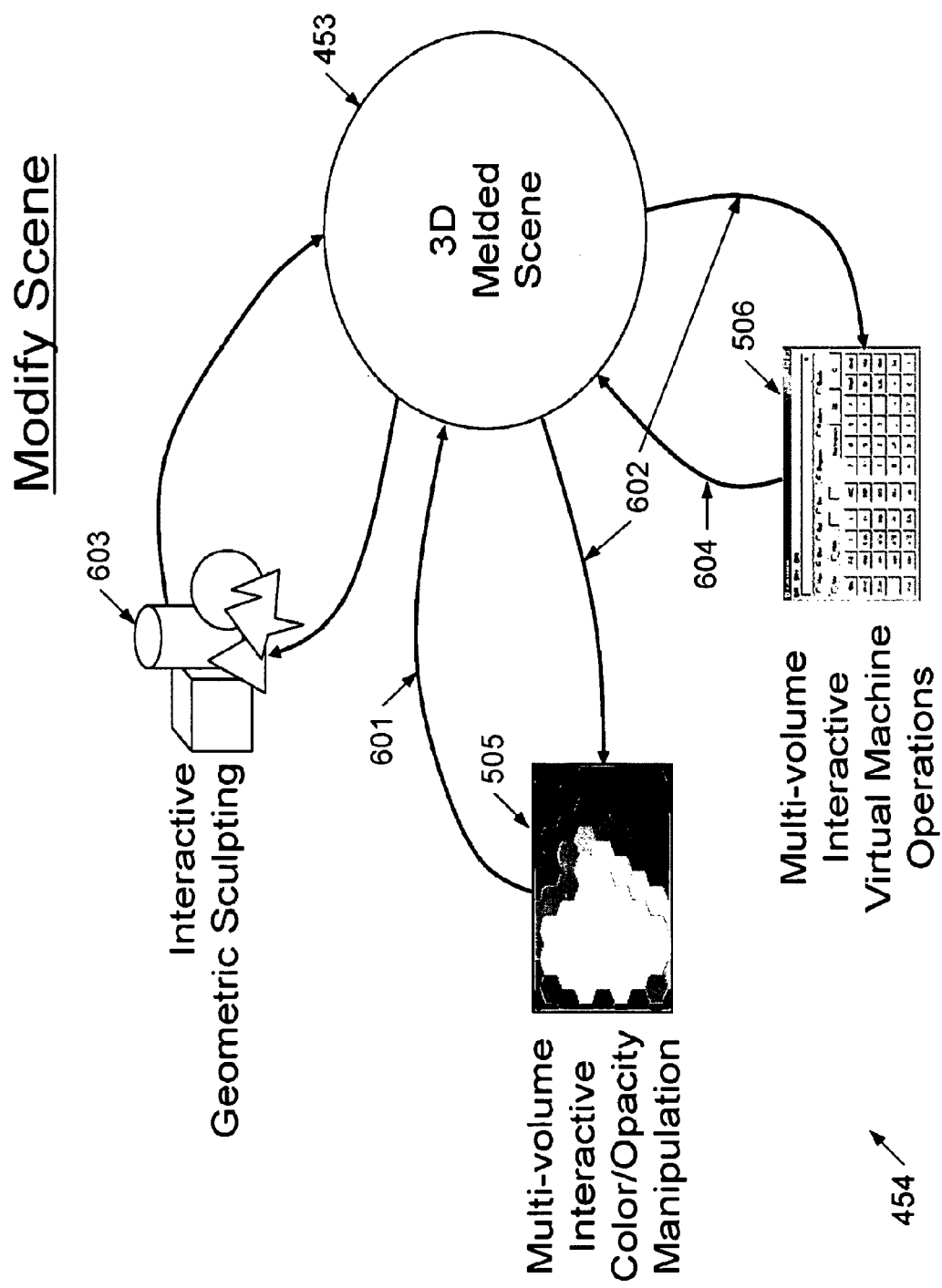
FIG. 6 shows a diagram of the modify scene procedure in visualizing and segmenting multiple data set of oilfield data s.

FIG. 6 shows a schematic diagram of the modify scene procedure (454 in FIG. 4) in visualizing and segmenting multiple data sets of oilfield data. Here, the modify scene procedure (454) includes multiple geometric sculpting forms (603), the color/opacity function (505), the virtual machine function (506), and the 3D melded scene (453). The color/opacity function (505), the virtual machine function (506), and the 3D melded scene (453) may be the same as shown and described in relation to FIG. 4 above. The multiple geometric sculpting forms (603) may include similar geometric shapes as the user defined geometric boundary (503) shown and described in relation to FIG. 4 above.

The modify scene procedure (454) may be used by the user of the workflow (400) to interact with the contents rendered in the 3D melded scene (453) to visually isolate connected sub-regions of interest in the 3D melded scene (453). For example, the color/opacity function (505) may be used by the user to perform multi-volume interactive color/opacity manipulation, i.e., independently manipulating (601) the color/opacity table within each overlapping geometric containers based on interactive feedback (602) of visually connected sub-regions of interest in the 3D melded scene (453). The final rendering may be further controlled using the virtual machine function (506) to provide multi-volume interactive virtual machine operations, i.e., independently manipulating (604) the numerical/logical functions within each overlapping geometric containers based on interactive feedback (602) of visually connected sub-regions of interest in the 3D melded scene (453).

The numerical/logical functions may be used to scale, combine, or otherwise manipulate the contents of the 3D volume data sets, the color tables, and/or the opacity tables. For example, it may be necessary to match the scales (e.g., using a numerical scaling function) of data/attribute values contained in the 3D volume data sets obtained from different surveys. Data/attribute values contained in the 3D volume data sets obtained from different versions of a single survey may be selectively combined (e.g., using numerical add, multiply function, logical AND, OR function, or other suitable numerical/logical functions) to give different weightings to the different versions. Color/opacity tables associated with different geometric containers containing different 3D volume data sets may also be selectively combined (e.g., using numerical add, multiply function, logical AND, OR function, or other suitable numerical/logical functions) to enhance, realize, emphasize, accentuate, or otherwise make visible connected sub-regions of interest in the 3D melded scene (453).

The color/opacity function (505) and the virtual machine function (506) may be interactively updated (601, 604) by the user observing (602) the dynamic effect on the visual content of the 3D melded scene (453) via an interactive user interface, which may include a window or a text box and may be commonly referred to as a graphical "widget." Moreover, the visually connected sub-regions of interest in the 3D melded scene (453) may be further manipulated (e.g., sculpted) by the user using the multiple geometric sculpting forms (603) to fine tune the geobody of interest. For example, each of the multiple geometric sculpting forms (603) may act as a mask to the rendered data thus behaving as a user-defined opacity boundary to delineate at least a portion of the contour of a geobody in the 3D melded scene (453).

Referring back to FIG. 4, based on co-rendering the 3D melded scene (453) concurrently and directly from two or more volume data sets using a combined rendering rule (without combining the two or more volume data sets into an intermediate resultant volume data set), the define scene procedure (452) and the modify scene procedure (454) allow the user to interactively produce a visual 3D image where multiple sub-regions of interest in the 3D melded scene (453) may be isolated from one another by transparent or near-transparent voxels. Each of these multiple sub-regions of interest may not be realizable from any single 3D volume data set and may only be visually identified based on combined opacity boundaries from multiple 3D volume data sets. Once a region of interest in the 3D melded scene (453) is visually identified, it may be extracted using the extract object procedure (455).

Figure 7:
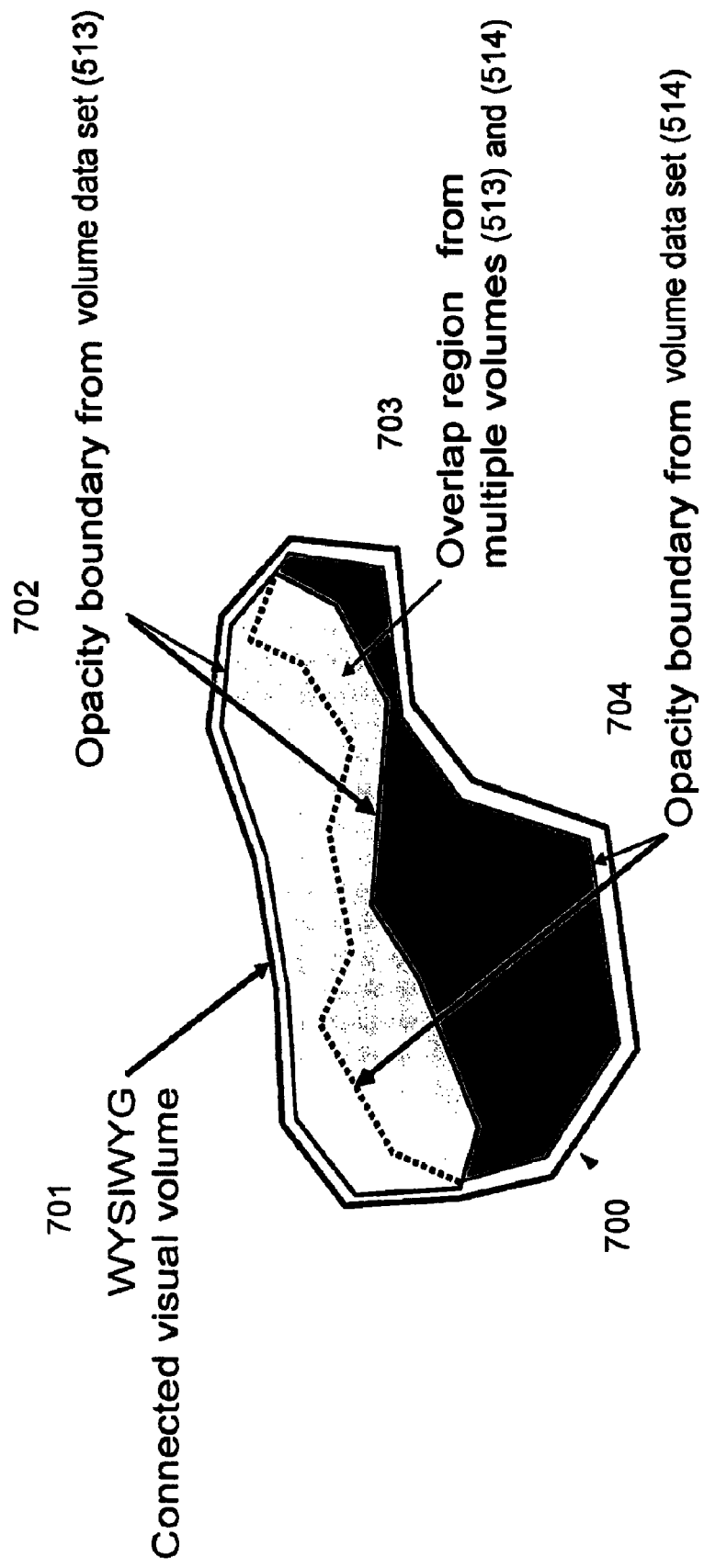
FIG. 7 shows a diagram of multi-volume extraction of a geobody.

FIG. 7 shows a schematic diagram of multi-volume extraction in visualizing and segmenting multiple data sets of oilfield data. Here, the geobody (700) is shown as connected visual object (701), opacity boundaries (702) and (704), and overlap region (703). In the example of FIG. 7, the connected visual object (701) is rendered from the 3D volume data sets (513) and (514) having an overlapping spatial extent. The 3D volume data sets (513) and (514) are rendered as having the opacity boundaries (702) and (704), respectively, as well as a overlap region (703) representing the overlapping spatial extent. The geobody (700) may correspond to one of the extracted objects (456) as shown in FIG. 4 above and is a representation of a geologic element or geological structure of the subterranean formation (304), as shown in FIG. 3B above.

As described above, the opacity boundaries (702) and (704), and overlap region (703) may be visually manipulated by the user interactively controlling the color/opacity tables and geometric containers corresponding to the 3D volume data sets (513) and (514) independently until the geobody (700) is visually identified in the 3D melded scene (453). In one example, a voxel within either the first geometric container corresponding to the 3D volume data set (513) or the second geometric container corresponding to the 3D volume data set (514) may be rendered as having an opacity according to the respective opacity table based on the association with the first or the second geometric container. The geobody may then be identified by the overlapping opacity boundaries (702) and (704).

In another example, the color and opacity of the 3D melded scene (453) may be determined by operations between multiple 3D volume data sets using the virtual machine function (506). For example, the color and opacity of the geobody (700) may be determined by an opacity weighted sum scheme or a direct product scheme. In the first example, a voxel within the first geometric container corresponding to the 3D volume data set (513) is rendered as having a first color and a first opacity according to a first color/opacity table based on the association with the first geometric container. If the voxel is also within a second geometric container corresponding to the 3D volume data set (514), the voxel is normally rendered as having a second color and a second opacity according to a second color/opacity table based on the association with the second geometric container. Given the voxel is within the overlapping spatial extent of both the 3D volume data sets (513) and (514), using the opacity weighted sum scheme, the voxel color is rendered as ((first opacity*first color)+(second opacity*second color))/(first opacity+second opacity) and the voxel opacity is rendered as (first opacity+second opacity).

Alternatively, in the second example, using the direct product scheme, the voxel color is rendered as (first color*second color) and the voxel opacity is rendered as (first opacity*second opacity).

Once the geobody (700) is visually identified and selected for extraction from the 3D melded scene (453), the extraction may be performed according to connectivity based segmentation. The connectivity may be defined in many ways known within the art, such as a Marching Cube algorithm or an exhaustive search from a seed point based on face-edge-corner connectivity. Based on co-rendering the 3D melded scene (453) concurrently and directly from multiple volume data sets without combining them into an intermediate resultant volume data set, the extraction may be performed concurrently from all the multiple 3D volume data sets, such as the 3D volume data sets (513) and (514) described above.

Figure 8:
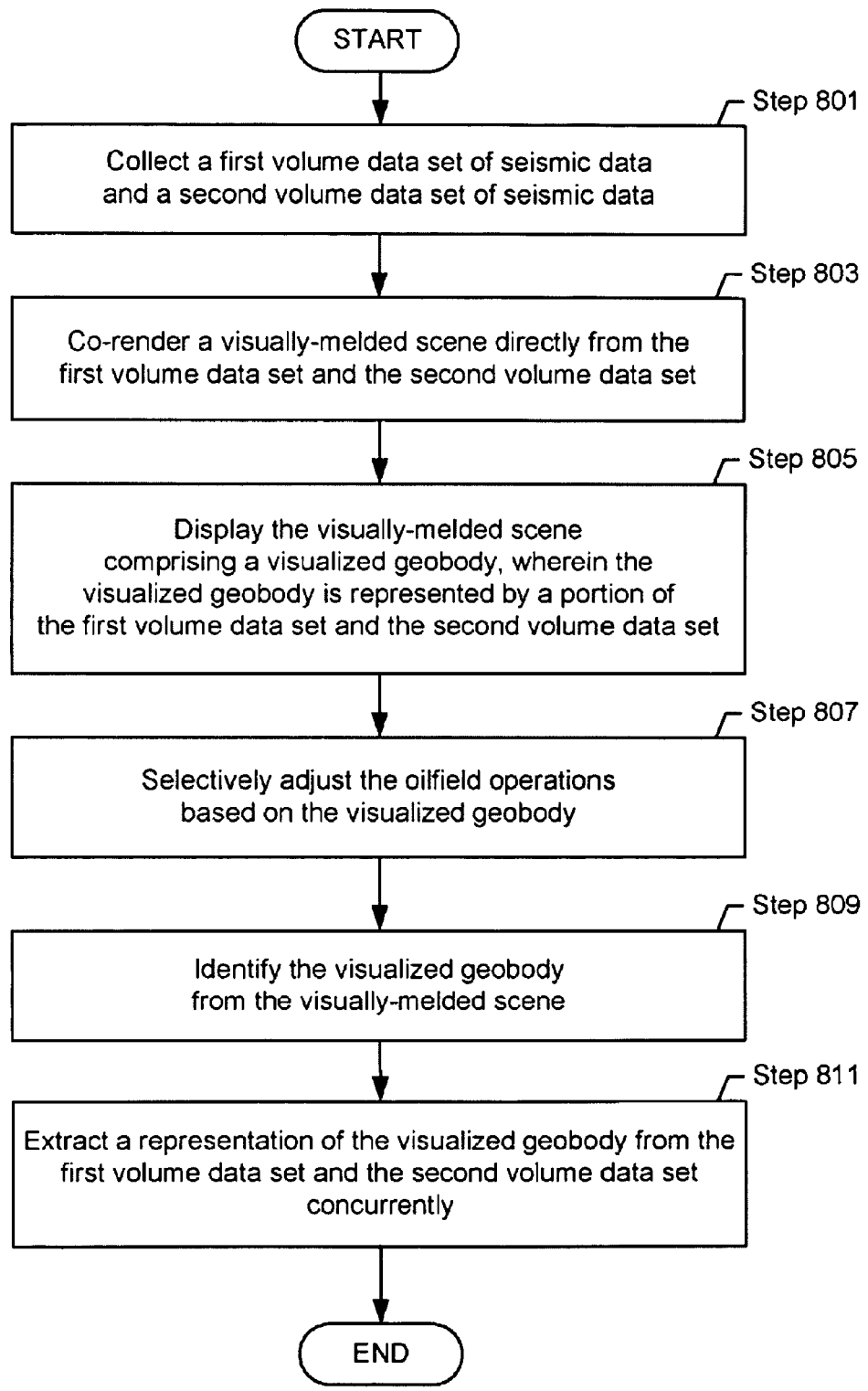
FIG. 8 shows a flow chart of method for visualizing and segmenting multiple volume data sets of oilfield data.

FIG. 8 shows a flow chart of a method for visualizing and segmenting multiple data sets of oilfield data. Initially, a first volume data set and a second volume data set are collected (Step 801). The first volume data set and the second volume data set may correspond to the 3D volume data set (513) and the 3D volume data set (514), as shown in FIG. 5 above. Further, the volume data set may be collected using the sensors and methods described above and shown in relation to FIGS. 1-3.

In Step (803), a visually-melded scene is co-rendered (i.e., rendered directly from multiple volume data sets without combining the multiple volume data sets into an intermediate resultant volume data set and/or rendered concurrently from multiple volume data sets without completing the rendering from any single volume data set before starting the rendering from the rest volume data sets) directly from the first volume data set and the second volume data set, such as the 3D volume data set (513) and the 3D volume data set (514), as shown in FIG. 5 above.

In Step (805), the visually-melded scene comprising a visualized geobody, is displayed, wherein the visualized geobody is represented by a portion of the first volume data set and the second volume data set. Here, the visualized geobody may correspond to the geobody (700) as shown in FIG. 7 above. The first volume data set and the second volume data set may correspond to the 3D volume data set (513) and the 3D volume data set (514), as shown in FIG. 5 above.

In Step (807), the oilfield operation is selectively adjusted based on the visualized geobody, such as the geobody (702) in FIG. 7 above. As described above, the geobody (700) may be a representation of a geologic element or geological structure of the subterranean formation (304 of FIG. 3). The oilfield operation may be one of the oilfield operations as depicted in FIGS. 1A-D. The geologic structure may be identified as a target fluid distribution, a fault structure, a sand stone formation, a shale formation, etc. according to the types and values of seismic measurements corresponding to the data/attributes associated with the first and the second volume data sets. For example, an access strategy (e.g., a drilling strategy) may be developed based on the visualized subterranean target fluid distribution.

In Step (809), the visualized geobody, e.g., the geobody (700), is identified from the visually-melded scene, such as the 3D melded scene (453 in FIG. 4). The identification may be performed using any of the examples as described in reference to FIGS. 6 and 7 above.

In Step (811), a representation of the visualized geobody from the first volume data set and the second volume data set is extracted concurrently.

The steps of the method are depicted in a specific order. However, it will be appreciated that the steps may be performed simultaneously or in a different order or sequence. Further, although the examples given above are described using 3D volume data sets and 3D displays, one skilled in the art will appreciate that the invention may be practiced with data sets and displays having different dimensions, such as 2D data sets and 2D displays, or the like.

It will be understood from the foregoing description that various modifications and changes may be made in the preferred and alternative embodiments of the present invention without departing from its true spirit. For example, the method may be performed in a different sequence, the components provided may be integrated or separate, the devices included herein may be manually and/or automatically activated to perform the desired operation. The activation may be performed as desired and/or based on data generated, conditions detected and/or analysis of results from downhole operations.

This description is intended for purposes of illustration only and should not be construed in a limiting sense. The scope of this invention should be determined only by the language of the claims that follow. The term "comprising" within the claims is intended to mean "including at least" such that the recited listing of elements in a claim are an open group. "A," "an" and other singular terms are intended to include the plural forms thereof unless specifically excluded.

What is claimed is:

1. A method of performing oilfield operations for an oilfield, the oilfield having a subterranean formation, comprising:
    collecting a first volume data set of seismic data and a second volume data set of seismic data;
    co-rendering a visually-melded scene, using a rendering unit, directly from the first volume data set and the second volume data set according to a co-rendering rule that, for spatial overlap of the first volume data set and the second volume data set, determines
        opacity of a voxel as a product or a sum of a first opacity associated with the first volume data set and a second opacity associated with the second volume data set, and
        color of a voxel as a product or an opacity weighted sum of a first color associated with the first volume data set and a second color associated with the second volume data set;
    displaying the visually-melded scene comprising a visualized geobody to a display unit, wherein the visualized geobody is represented by at least a portion of the first volume data set and at least a portion of the second volume data set; and
    adjusting the oilfield operations based on the visualized geobody.

2. The method of claim 1, further comprising:
    identifying the visualized geobody from the visually-melded scene; and
    extracting a representation of the visualized geobody from the first volume data set and the second volume data set concurrently.

3. The method of claim 2, wherein the representation of the visualized geobody comprises a spatially overlapped portion of the first volume data set and the second volume data set.

4. The method of claim 1, further comprising:
defining a first rendering rule for rendering from the first volume data set, wherein the first rendering rule comprises at least one selected from a group consisting of a first color table and a first opacity table;
defining a second rendering rule for rendering from the second volume data set, wherein the second rendering rule comprises at least one selected from a group consisting of a second color table and a second opacity table; and
defining the co-rendering rule, wherein the co-rendering rule comprises applying at least one selected from a group consisting of a numerical operation and a logical operation to at least one selected from a group consisting of the first rendering rule, the second rendering rule, the first volume data set, and the second volume data set; and
co-rendering the visually-melded scene from at least a spatially overlapped portion of the first volume data set and the second volume data set according to the co-rendering rule.

5. The method of claim 1, further comprising:
modifying at least one rule selected from a group consisting of a first rendering rule associated with the first volume data set, a second rendering rule associated with the second volume data set, and the co-rendering rule; and
adjusting the visually-melded scene to form the visualized geobody based on the at least one rule.

6. The method of claim 1, further comprising:
delineating a first portion of the visualized geobody by defining a first opacity table to produce a first opacity boundary representing at least a portion of the first volume data set; and
delineating a second portion of the visualized geobody by defining a second opacity table to produce a second opacity boundary representing at least a portion of the second volume data set.

7. The method of claim 1,
wherein opacity of a voxel in a spatially overlapped portion of the first volume data set and the second volume data set is a sum of a first opacity according to a first rendering rule associated with the first volume data set and a second opacity according to a second rendering rule associated with the second volume data set,
wherein color of the voxel is an opacity weighted sum of a first color according to the first rendering rule and a second color according to the second rendering rule, and
wherein the first color is weighted by the first opacity and the second color is weighted by the second opacity in generating the opacity weighted sum.

8. The method of claim 1,
wherein color of a first voxel in a spatially overlapped portion of the first volume data set and the second volume data set is a product of a first color according to a first rendering rule associated with the first volume data set and a second color according to a second rendering rule associated with the second volume data set, and
wherein opacity of the voxel is a product of a first opacity according to the first rendering rule and a second opacity according to the second rendering rule.

9. The method of claim 1, further comprising:
defining a geometric boundary to limit the visually-melded scene.

10. The method of claim 1, further comprising:
defining a geometric boundary to limit the visualized geobody.

11. A non-transitory computer readable medium, embodying instructions executable by the computer to perform method steps for performing oilfield operations for an oilfield, the oilfield having a subterranean formation, the instructions comprising functionality to:
collect a first volume data set of seismic data and a second volume data set of seismic data;
co-render a visually-melded scene directly from the first volume data set and the second volume data set according to a co-rendering rule that, for spatial overlap of the first volume data set and the second volume data set, determines
opacity of a voxel as a product or a sum of a first opacity associated with the first volume data set and a second opacity associated with the second volume data set, and
color of a voxel as a product or an opacity weighted sum of a first color associated with the first volume data set and a second color associated with the second volume data set;
display the visually-melded scene comprising a visualized geobody, wherein the visualized geobody is represented by at least a portion of the first volume data set and at least a portion of the second volume data set; and
adjust the oilfield operations based on the visualized geobody.

12. The non-transitory computer readable medium of claim 11, wherein the instructions further comprises functionality to:
identify the visualized geobody from the visually-melded scene; and
extract a representation of the visualized geobody from the first volume data set and the second volume data set concurrently.

13. The non-transitory computer readable medium of claim 11, wherein the instructions further comprises functionality to:
define a first rendering rule for rendering from the first volume data set, wherein the first rendering rule comprises at least one selected from a group consisting of a first color table and a first opacity table;
define a second rendering rule for rendering from the second volume data set, wherein the second rendering rule comprises at least one selected from a group consisting of a second color table and a second opacity table;
define the co-rendering rule, wherein the co-rendering rule comprises applying at least one selected from a group consisting of a numerical operation and a logical operation to at least one selected from a group consisting of the first rendering rule, the second rendering rule, the first volume data set, and the second volume data set; and
co-render the visually-melded scene from at least a spatially overlapped portion of the first volume data set and the second volume data set according to the co-rendering rule.

14. The non-transitory computer readable medium of claim 11, wherein the instructions further comprises functionality to:
define a geometric boundary to limit the visually-melded scene.

15. The non-transitory computer readable medium of claim 11, wherein the instructions further comprises functionality to:
define a geometric boundary to limit the visualized geobody.

16. A system for performing oilfield operations for an oilfield, the oilfield having a subterranean formation, comprising:
- a surface unit for collecting oilfield data, at least a portion of the oilfield data being seismic data;
- a modeling tool operatively linked to the surface unit, the modeling tool comprising:
  - a processing module for processing the oilfield data into a first volume data set and a second volume data set; and
  - a data rendering unit for co-rendering a visually-melded scene from the first volume data set and the second volume data set according to a co-rendering rule that, for spatial overlap of the first volume data set and the second volume data set, determines
    - opacity of a voxel as a product or a sum of a first opacity associated with the first volume data set and a second opacity associated with the second volume data set, and
    - color of a voxel as a product or an opacity weighted sum of a first color associated with the first volume data set and a second color associated with the second volume data set;
- a display unit for displaying the visually-melded scene comprising a visualized geobody, wherein the visualized geobody represents at least a portion of the first volume data set and at least a portion of the second volume data set; and
- a drilling system operatively linked to the surface unit for retrieving target fluid in a reservoir of the subterranean formation, wherein the drilling system is adjusted based on the visualized geobody.

17. The system of claim 16, wherein the modeling tool further comprises functionality to:
- identify the visualized geobody from the visually-melded scene; and
- extract a representation of the visualized geobody from the first volume data set and the second volume data set concurrently.

18. The system of claim 17, wherein the representation of the visualized geobody comprises a spatially overlapped portion of the first volume data set and the second volume data set.

19. The system of claim 16, wherein the modeling tool further comprises functionality to:
- define a first rendering rule for rendering from the first volume data set, wherein the first rendering rule comprises at least one selected from a group consisting of a first color table and a first opacity table;
- define a second rendering rule for rendering from the second volume data set, wherein the second rendering rule comprises at least one selected from a group consisting of a second color table and a second opacity table;
- define the co-rendering rule, wherein the co-rendering rule comprises applying at least one selected from a group consisting of numerical operation and logical operation to least one selected from a group consisting of the first rendering rule, the second rendering rule, the first volume data set, and the second volume data set; and
- co-render the visually-melded scene from at least a spatially overlapped portion of the first volume data set and the second volume data set according to the co-rendering rule.

20. The system of claim 16, wherein the modeling tool further comprises functionality to:
- modify at least one rule selected from a group consisting of a first rendering rule associated with the first volume data set, a second rendering rule associated with the second volume data set, and the co-rendering rule; and
- adjust the visually-melded scene to form the visualized geobody based on the at least one rule.

21. The system of claim 16, wherein the modeling tool further comprises functionality to:
- delineate a first portion of the visualized geobody in the visually-melded scene by defining a first opacity table to produce a first opacity boundary representing at least a portion of the first volume data set; and
- delineate a second portion of the visualized geobody in the visually-melded scene by defining a second opacity table to produce a second opacity boundary representing at least a portion of the second volume data set.

22. The system of claim 16,
- wherein opacity of a voxel in a spatially overlapped portion of the first volume data set and the second volume data set is a sum of a first opacity according to a first rendering rule associated with the first volume data set and a second opacity according to a second rendering rule associated with the second volume data set,
- wherein color of the voxel is an opacity weighted sum of a first color according to the first rendering rule and a second color according to the second rendering rule, and
- wherein the first color is weighted by the first opacity and the second color is weighted by the second opacity in generating the opacity weighted sum.

23. The system of claim 16,
- wherein color of a first in a spatially overlapped portion of the first volume data set and the second volume data set is a product of a first color according to a first rendering rule associated with the first volume data set and a second color according to a second rendering rule associated with the second volume data set, and
- wherein opacity of the voxel is a product of a first opacity according to the first rendering rule and a second opacity according to the second rendering rule.

24. The system of claim 16, wherein the modeling tool further comprises functionality to:
- define a geometric boundary to limit the visually-melded scene.

25. The system of claim 16, wherein the modeling tool further comprises functionality to:
- define a geometric boundary to limit the visualized geobody.

* * * * *